United States Patent [19]
Morris

[11] Patent Number: 5,280,985
[45] Date of Patent: Jan. 25, 1994

[54] METHOD AND APPARATUS FOR MOBILE ELEVATABLE EXPANDABLE VIEWING STUDIO

[76] Inventor: Richard B. Morris, 22820 Imperial Valley Dr. #407, Houston, Tex. 77073

[21] Appl. No.: 7,835

[22] Filed: Jan. 22, 1993

[51] Int. Cl.5 .............................................. B60P 3/34
[52] U.S. Cl. ................................... 296/26; 187/8.72; 187/9 R
[58] Field of Search ................. 296/26, 165, 171; 187/8.72, 9 R, 141; 414/589

[56] References Cited

U.S. PATENT DOCUMENTS

| | | | |
|---|---|---|---|
| 2,193,352 | 3/1940 | Thomas | 296/171 |
| 2,414,453 | 1/1947 | France | 358/149 |
| 2,704,223 | 3/1955 | Houdart | 296/171 |
| 2,765,499 | 10/1956 | Couse | 52/66 |
| 2,901,282 | 8/1959 | Meaker | 296/171 |
| 3,407,548 | 10/1968 | Russell | 296/171 |
| 3,554,317 | 1/1971 | Birbanescu | 182/14 |
| 3,587,528 | 6/1971 | Lake | 119/16 |
| 3,612,589 | 10/1971 | Locher, Jr. | 296/171 |
| 3,841,036 | 10/1974 | Johnson | 52/143 |
| 4,011,404 | 3/1977 | Graham | 358/185 |
| 4,026,076 | 5/1977 | Analetto | 52/65 |
| 4,270,791 | 6/1981 | Tann | 296/171 |
| 4,295,679 | 10/1981 | Artweger et al. | 296/171 |
| 4,546,578 | 10/1985 | Behrmann | 52/67 |
| 4,741,413 | 5/1988 | Kishi | 187/8.72 |
| 4,958,874 | 9/1990 | Hegedus | 296/26 |
| 5,054,578 | 10/1991 | Smillie, III et al. | 296/26 X |
| 5,061,001 | 10/1991 | Madden et al. | 296/26 |
| 5,090,749 | 2/1992 | Lee | 296/171 |
| 5,102,179 | 4/1992 | Royer | 296/26 |
| 5,145,029 | 9/1992 | Blasdell, Jr. et al. | 182/63 |
| 5,152,109 | 10/1992 | Boers | 52/143 |
| 5,154,469 | 10/1992 | Morrow | 296/26 |

*Primary Examiner*—Robert R. Song
*Attorney, Agent, or Firm*—Pravel Hewitt Kimball & Krieger

[57] ABSTRACT

Method for providing, and system for, a mobile, elevatable, expandable and retractable viewing studio for temporary installation at outdoor locations, with particular application for television announcers and broadcasting.

10 Claims, 13 Drawing Sheets

Figure 11

METHOD AND APPARATUS FOR MOBILE ELEVATABLE EXPANDABLE VIEWING STUDIO

FIELD OF INVENTION

This invention relates to a mobile, elevatable, expandable and retractable viewing studio and a method for providing a mobile viewing studio, in particular for outdoor events for the television media.

BACKGROUND OF THE INVENTION

Within the television industry there is a segment devoted to the broadcasting and cablecasting of events on location, and in particular, on outdoor locations. Sporting events, such as golf, tennis or beach volleyball, offer prime examples of such events. A need arises to place the announcers and broadcasters in a studio environment at this location. Yet, these announcers and broadcasters also need to be where the action is, with good visibility.

Presently the two most common options used to create a television studio environment on outdoor event locations are (1) constructing an elevated temporary studio using construction scaffolding or (2) modifying a portable modular office trailer that is trucked in. Depending on the event, various elevations for the studio or announcers, position are preferred. When elevation is desired, the scaffolding system is used. The scaffolding is erected to a desired height and then the top level is partially enclosed. When elevation is not a factor, a modular office trailer can be used.

A third option exists that is not widely used in the industry. It is comprised of a one of a kind studio trailer. This trailer is constructed of wood and steel upon a trailer base and includes an add-on structure for one side that must be attached on-site. This trailer is owned by one individual and used by one company in the industry.

The present invention discloses a portable, expandable and retractable, elevatable viewing studio that will meet the composite needs of the television industry. Through integration and modification of existing diverse technologies, the present invention combines the desirable features of the above three on-location television studio options to achieve efficient versatile adjustable on-location viewing. In particular, the present invention offers a viewing studio that is able to accommodate preferred elevation requirements and studio space needs while remaining self-contained and portable. The mobile studio does not require extensive erection and disassembly on site, as with the fixed scaffolding system. The studio is not only portable over the highway system, and adjustably elevatable to achieve the requisite view, but the studio expands to provide studio space requirements for television announcers and broadcasters on location, above and beyond those of a standard bus or trailer.

Presently the airline industry uses a variety of hydraulic lift vehicles. E.g. one such vehicle is used to deliver food service supplies to airplanes. Hi-Way, Inc. of Bartow, Fla., manufactures vehicles of this sort. The vehicle is driven to the airplane and elevated to the loading door for loading and unloading supplies. Another similar vehicle is known, an elevatable bus, used to transport passengers from airport terminals directly on to an airplane.

The trucking industry has developed designs for foldout trailers. Versions of such a design are offered for use as cargo trailers or concession trailers. Southern Truck Body Corporation of Tampa, Fla. advertises such trailer designs.

The present invention, to achieve its purposes, integrates technologies from these diverse industries into one design. The invention combines the modified technologies of a hydraulic lift vehicle with that of an expandable truck body. This disclosed combination of technologies creates a portable viewing studio system unique to the industry. The invention will be most useful to the television media, although uses outside of this industry can be foreseen, such as a mobile elevatable viewing room for VIP groups at outdoor events.

SUMMARY OF THE INVENTION

This invention discloses a method for providing a mobile, elevatable viewing studio for on-location outdoor events. The studio is particularly designed for the height and space requirements of the television media. The method includes trucking a studio in a retracted configuration to an outdoor location, the retracted studio having a width, height and length that can be trucked over the normal highway system. The studio at location is elevated to at least ten feet using automatic lift means attached to the truck chassis and studio base. The studio is further expanded in at least one direction. Preferably, the studio is expanded in two opposing directions. The elevating means preferably includes operating a hydraulic lift. The method may further include elevating and lowering a balcony attached to one side or end of the studio.

This invention also teaches a mobile, elevatable, expandable and retractable viewing studio system. The system includes a studio having a retracted and an expanded configuration. In the retracted configuration the studio has a width, height and length that permits it to be trucked over the highway system. The studio is attached to a truck chassis. Automatic lift means are attached to and operate between the studio base and the truck chassis. The automatic lift means are adequate to elevate the studio at least ten feet. The studio includes at least one expandable side. Preferably the studio includes two opposing expandable sides. Preferably, the automatically lift means involves hydraulic operation. The system may include an elevatable balcony attached to one side or end of the studio.

DESCRIPTION OF THE PREFERRED EMBODIMENT

Figure 1:
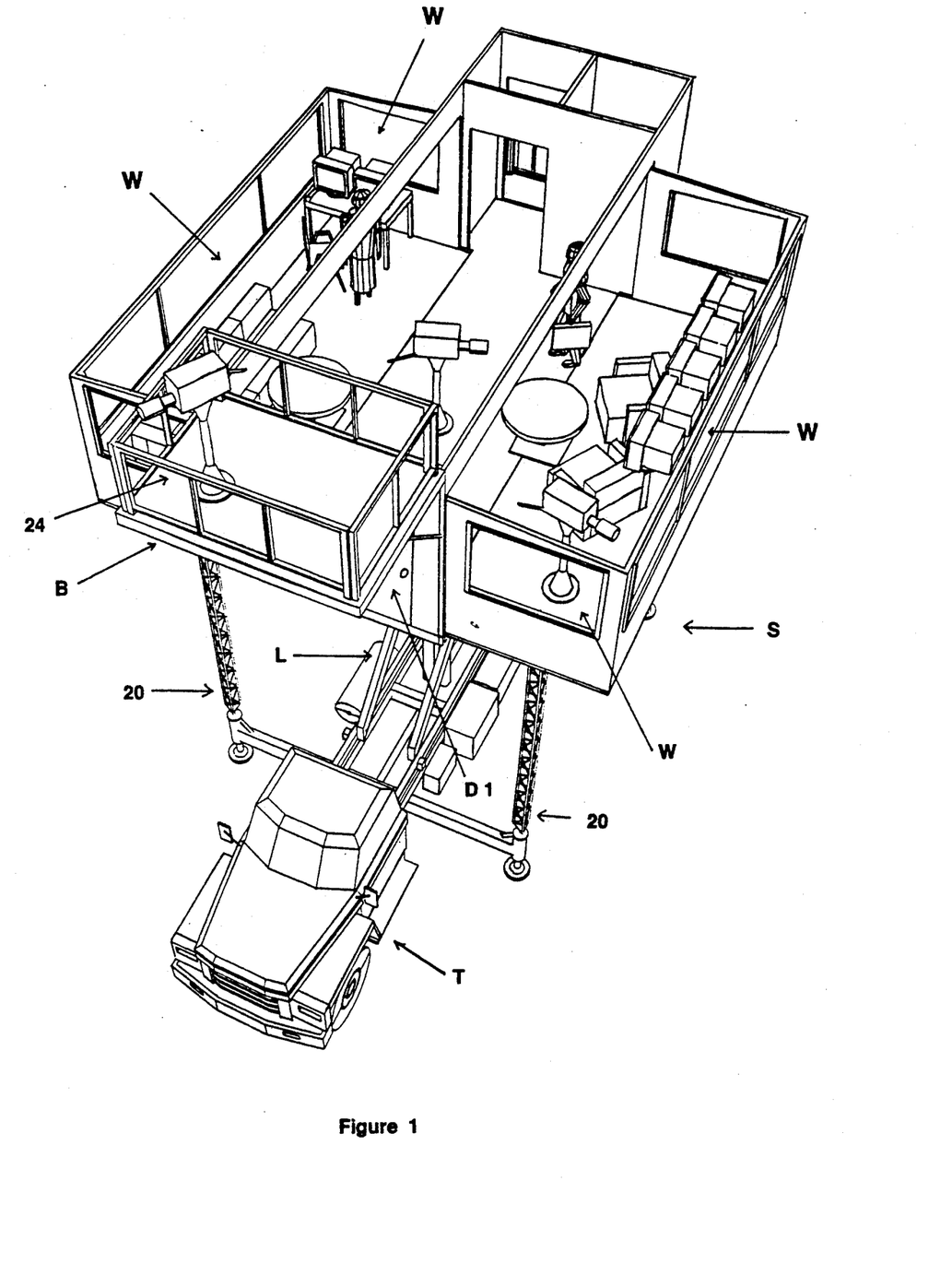
FIG. 1 illustrates one embodiment of the present invention wherein the truck is on location and the studio elevated and expanded. The roof of the studio is not shown for illustrative purposes.

FIG. 1 illustrates one embodiment of the invention wherein studio S has been trucked by truck T to a location and has been elevated and expanded. The roof or ceiling of the studio in FIG. 1 is not shown for illustrative purposes. The studio in the embodiment of FIG. 1 has been expanded to each side. Balcony B is illustrated in the embodiment as attached to studio S at the front of the studio. Balcony B can be raised and lowered, by means not shown but known in the art, from its elevated position roughly equal to the ceiling of the studio to a lowered position that would be roughly the same elevation as the floor of studio S. Lifting means L, attached to the truck or truck chassis and attached to the floor or base of studio S, are illustrated in FIG. 1. Additionally, support struts 20 are shown in the embodiment. Support struts 20 help stabilize and support the elevated, expanded studio.

As can be seen from the illustration of FIG. 1, the expanded studio provides the requisite space needed for television announcers and for broadcasting purposes. It is intended that a small room at the rear of the studio be outfitted as a restroom. Windows in the walls of the expanded studio provide for 360° viewing. It is anticipated that provision will be made for the temperature inside the studio to be controlled and to equip the studio with video, audio and telephone connections.

Figure 2:
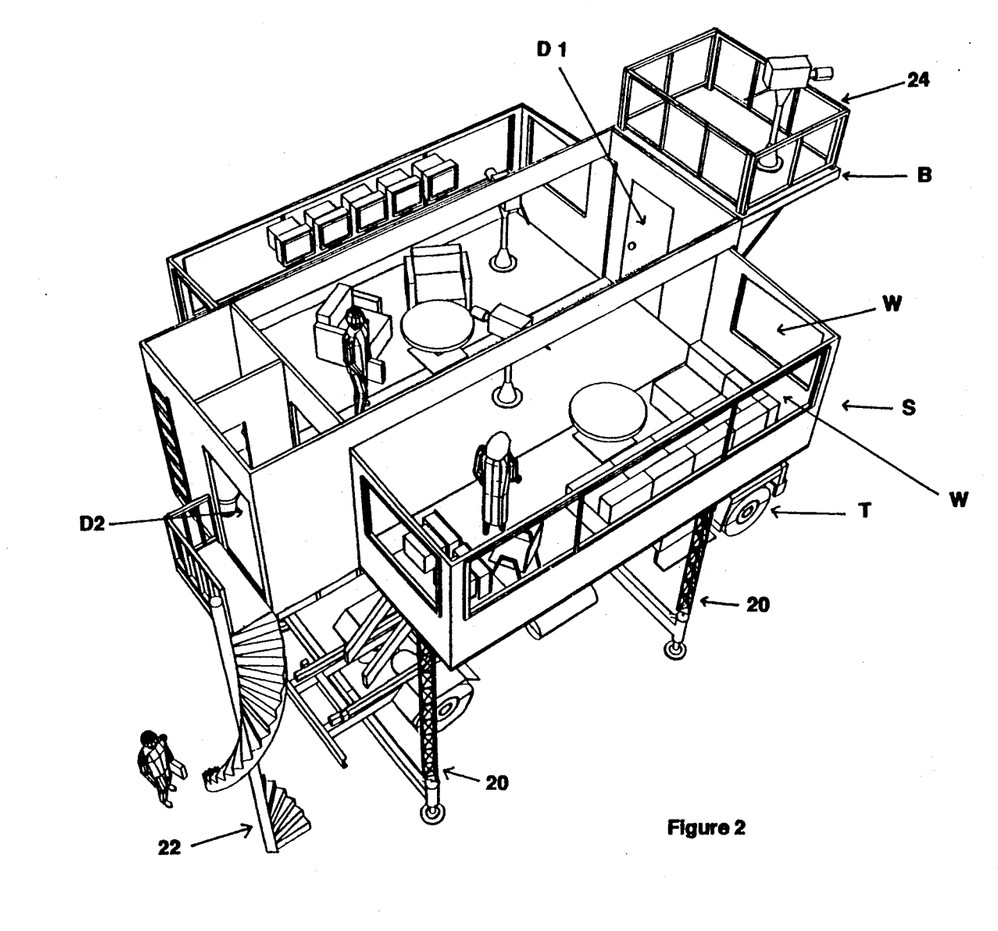
FIG. 2 illustrates the embodiment of FIG. 1 from a different perspective.

FIG. 2 offers an alternate view of the embodiment of FIG. 1. Doors D1 and D2 are shown. Door D2 connects stairway 22 with the interior of studio S. Doorway D1 connects the interior of studio S with balcony B for use when balcony B is at an elevation analogous to the floor of studio S. It is intended that balcony B will operate predominantly as a camera position when elevated to its higher level. At floor level balcony B can be utilized as an extra balcony for outside viewing. Balcony B is provided with railing 24.

Figure 3:
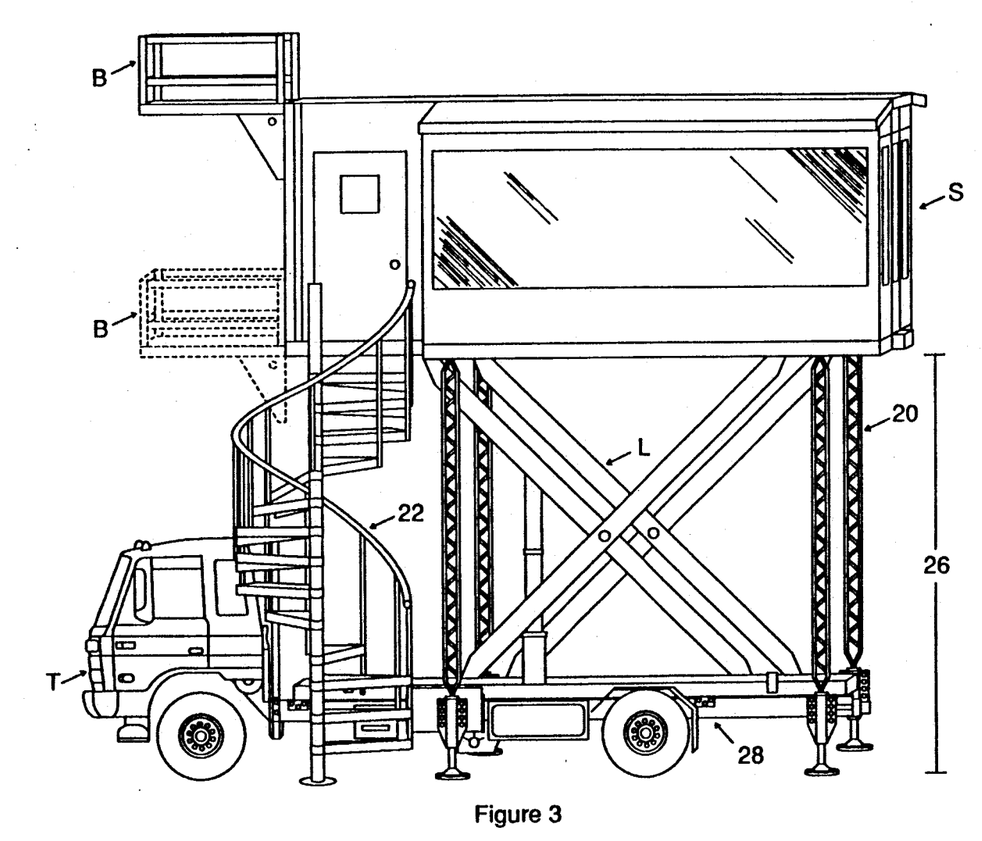
FIG. 3 offers a side view of one embodiment of a mobile studio, as installed on location, indicating a raising and lowering open air balcony.

FIG. 3 offers a side view of another embodiment of the mobile studio, installed on location with studio S elevated and expanded. In FIG. 3 balcony B is shown in solid lines in an elevated condition and in dashed lines in a lowered condition. Hydraulic lift unit L for the studio is illustrated in more detail in FIG. 3.

In the preferred embodiment, a chosen truck chassis 28 will have a hydraulic lift system L attached to it. Hydraulic lift unit L will further attach to the base, such as the floor or a platform attached to the floor, of studio S. Modifications can be made to currently available hydraulic lift systems to support the structure of studio S and, in particular, to allow for the extra weight of the expandable studio body. In FIG. 3 the studio is illustrated as elevated to a distance 26 of approximately 18 feet.

Figure 4:
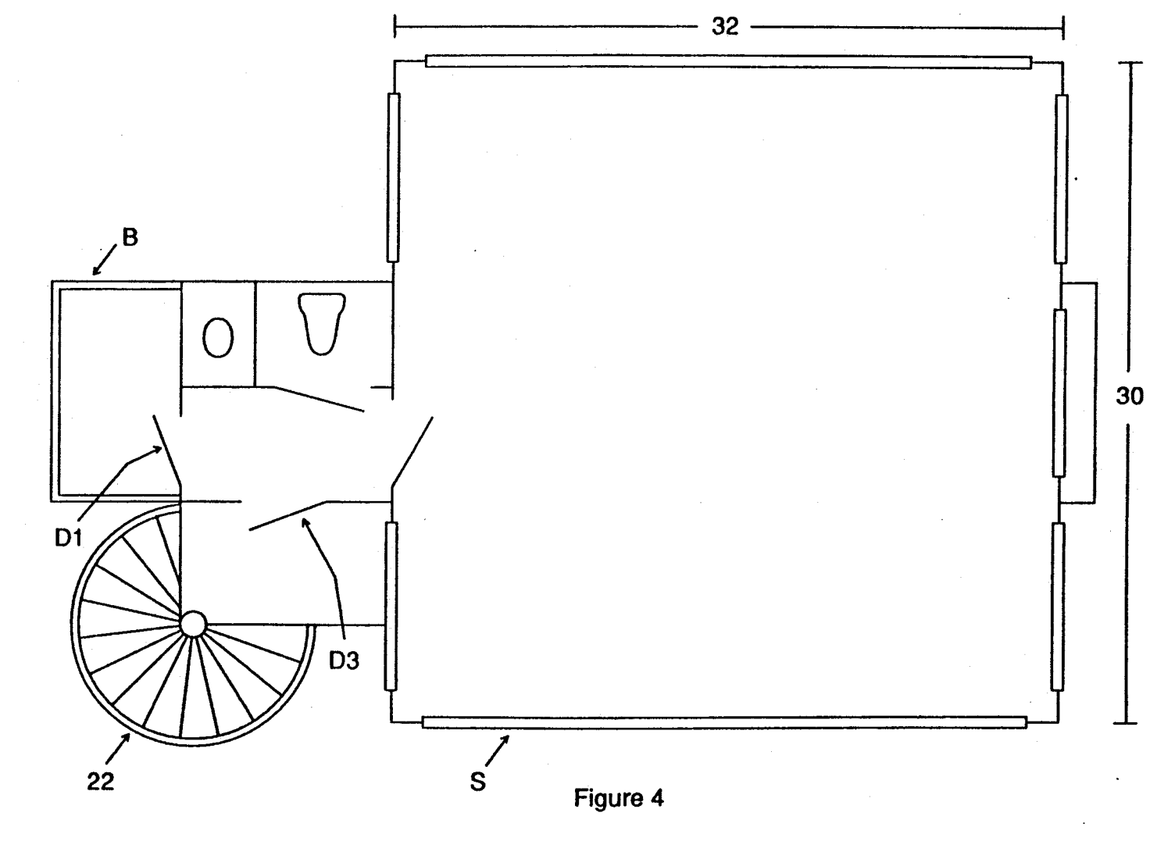
FIG. 4 offers an illustrative floor plan for a mobile viewing studio as expanded.

FIG. 4 offers an illustrative floor plan for a mobile viewing studio in its expanded configuration. The length 32 and width 30 of the main portion of studio S of the embodiment of FIG. 4 are both approximately 20 feet.

Figure 5:
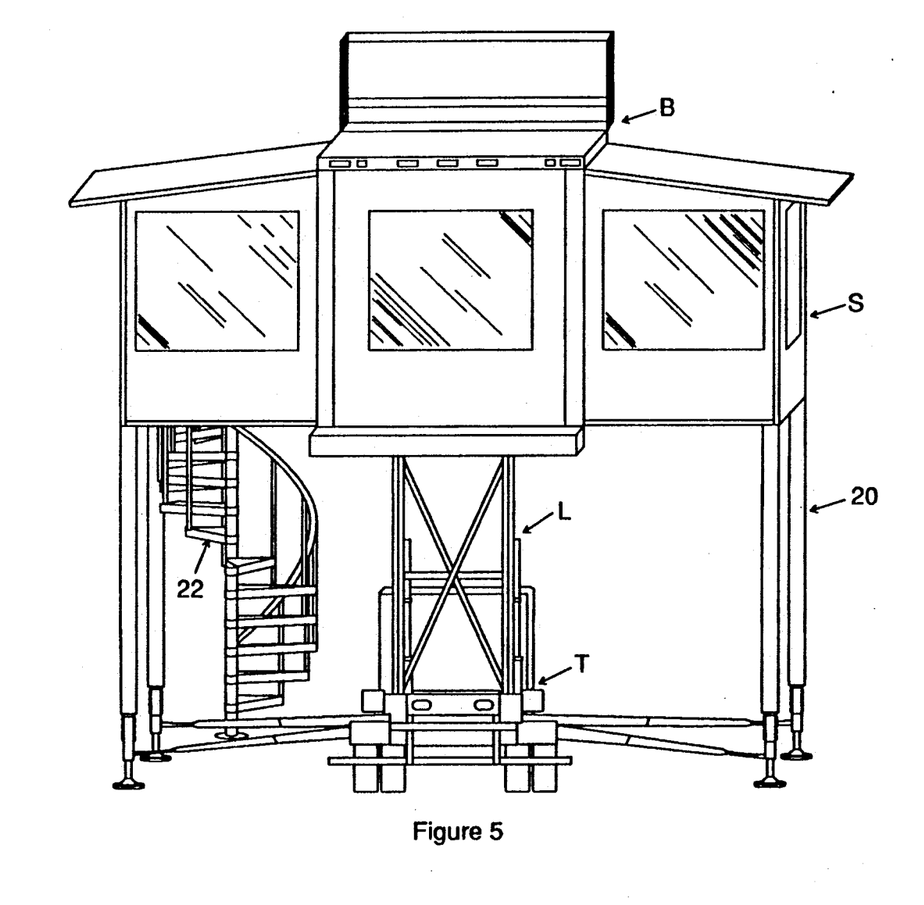
FIG. 5 offers a rear view of an embodiment of the mobile studio as installed on location.

FIG. 5 offers a rear outside view of an embodiment of the mobile studio as installed on location with studio S elevated and expanded.

Figure 6:
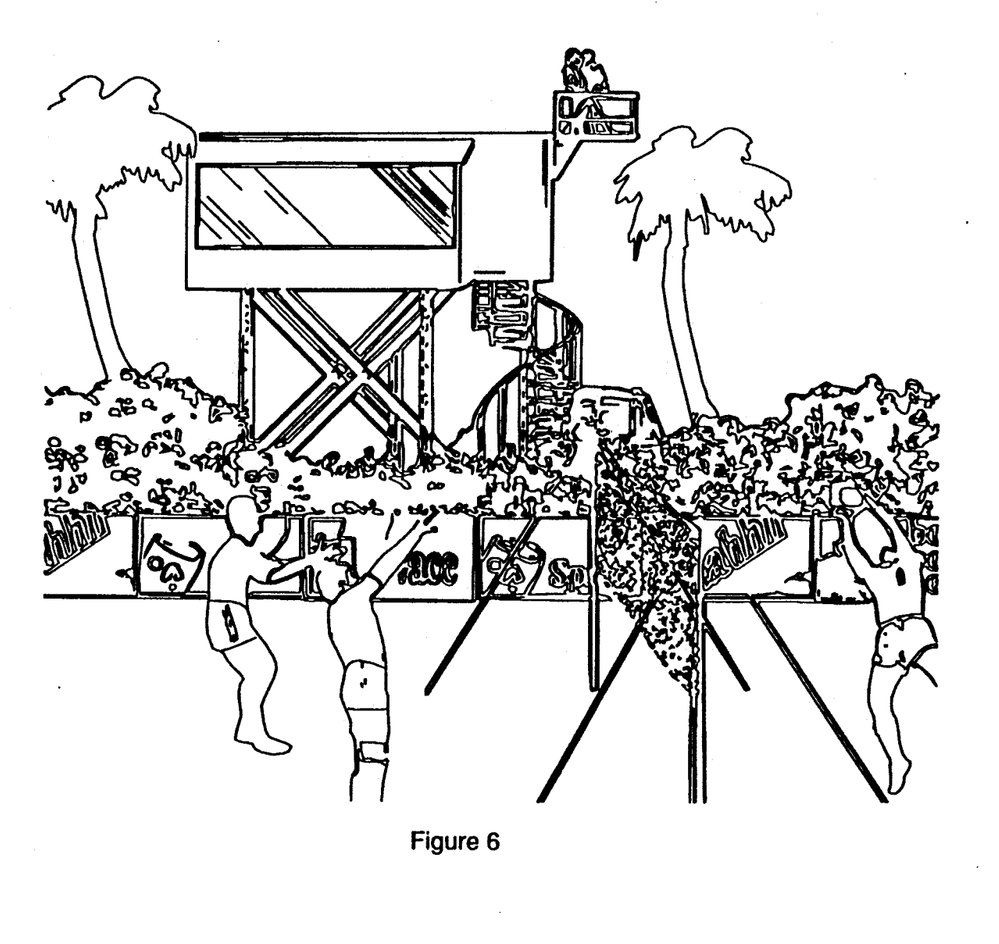
FIG. 6 illustrates the usefulness of the mobile, elevatable studio employed as a television studio.

FIG. 6 illustrates the usefulness of the mobile studio method and system as installed on location at an outdoor event.

Figure 7:
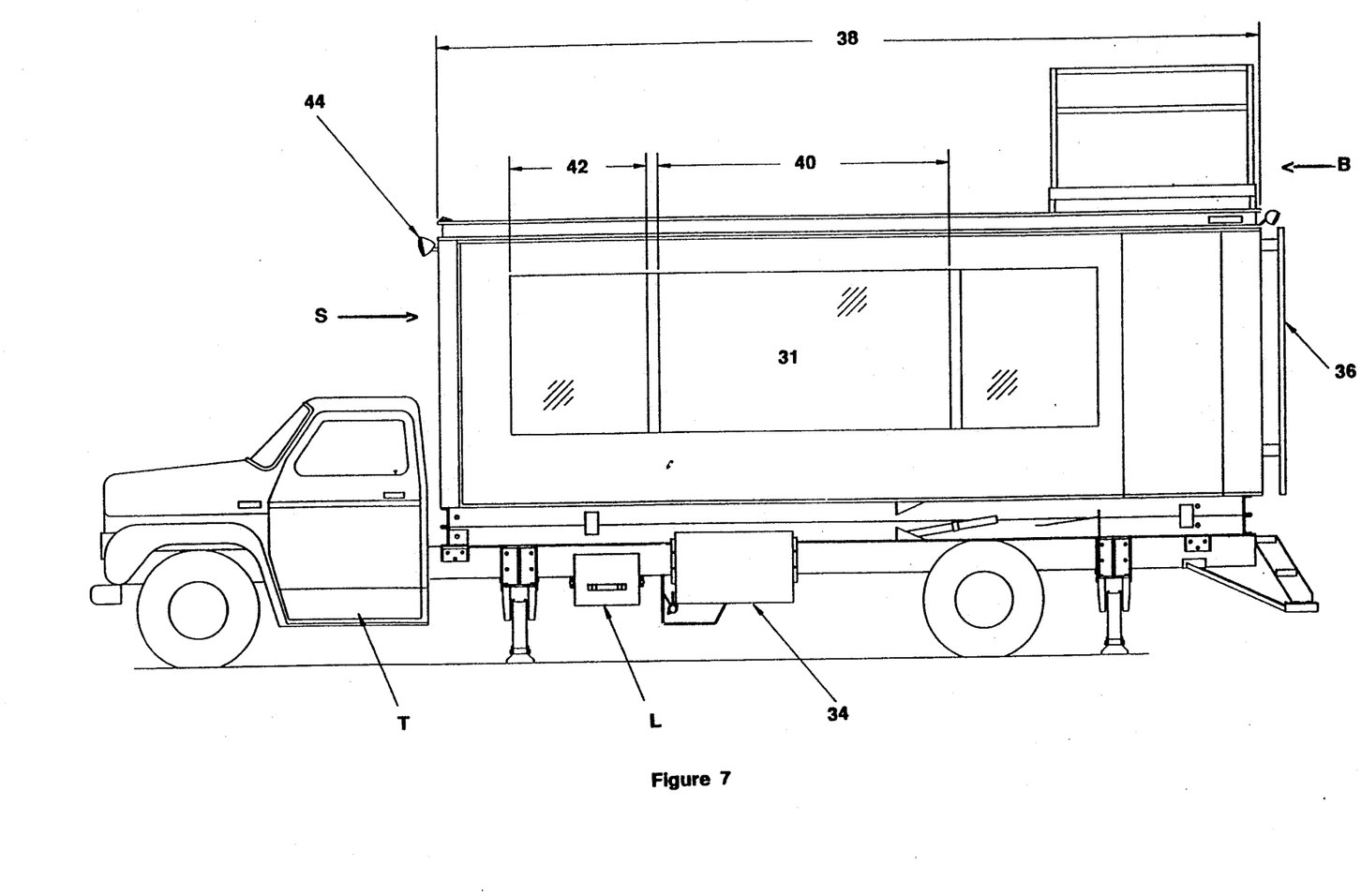
FIG. 7 illustrates a side view of the present invention wherein the viewing studio is carried on, but has not been elevated above or expanded from the chassis of, the truck.

FIG. 7 illustrates a side view of an embodiment of the present invention wherein the studio is carried in its retracted configuration on the truck. In FIG. 7 Studio S has not been elevated or expanded from the chassis of truck T. In regard to truck T, a chassis of choice should be available from both domestic and imported sources. Lift means L of the embodiment of FIG. 7 includes a custom built hydraulic control package for operation of all unit functions, installed on the chassis of truck T. Element 34 of FIG. 7 illustrates a hydraulic tank attached to the chassis of truck T. It is estimated that hydraulic tank 34 would contain approximately 30 gallons of fluid with ports built in for heaters and service. Element 36, illustrated attached to the rear of studio S, represents a ladder for access to camera platform balcony B. In the embodiment of the invention illustrated in FIG. 7, the length of studio S in its retracted configuration is approximately 25 feet. The width 40 of central window W is anticipated to be approximately 8 feet. The width 42 of side window W is anticipated to be approximately 4 feet. Lighting 44 is provided as required, in AC or DC power.

Figure 8:
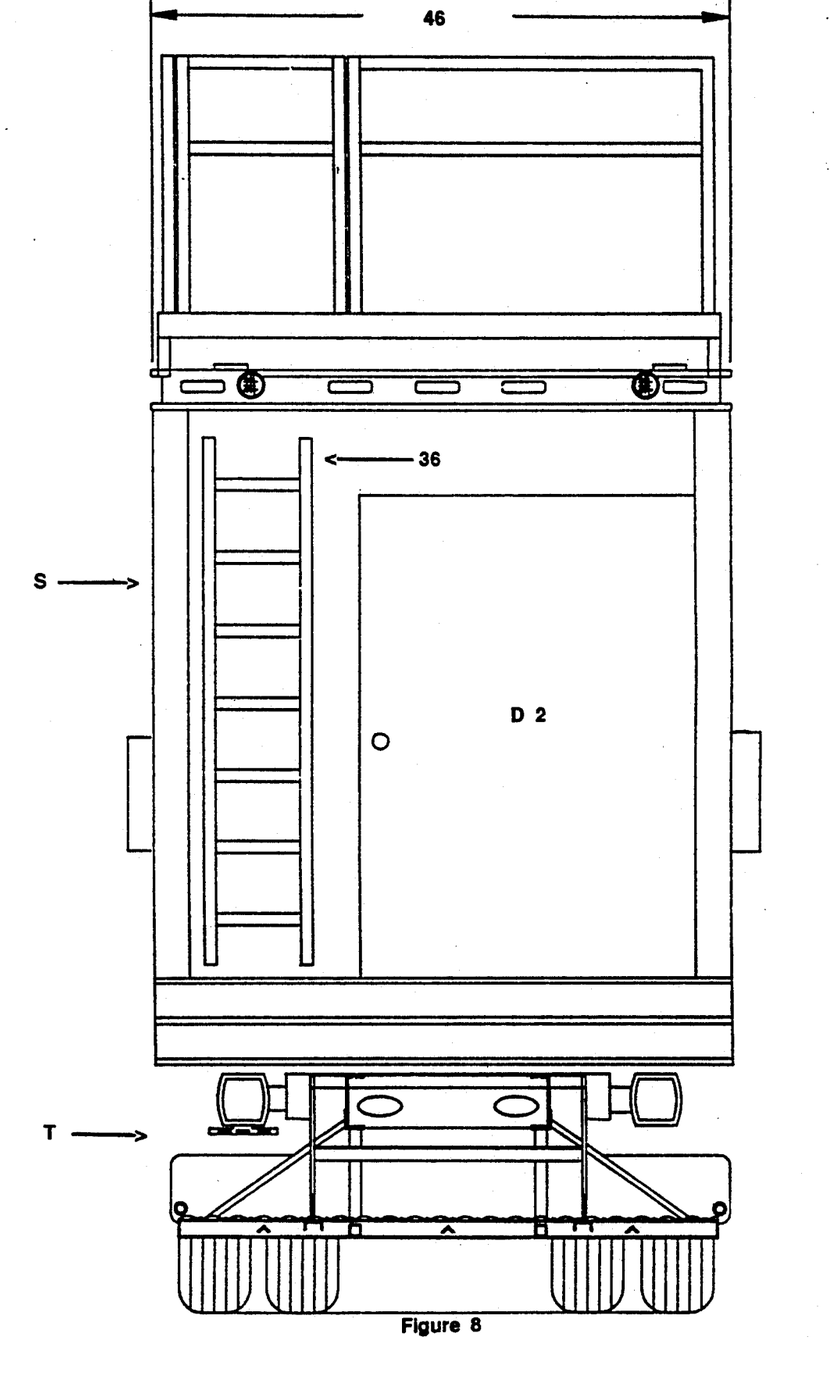
FIG. 8 offers a rear view of the illustration of FIG. 7.

FIG. 8 offers a rear view of the embodiment illustrated in FIG. 7. FIG. 8 illustrates the width 46 of studio S in its retracted configuration to be approximately 8½ feet.

Figure 9:
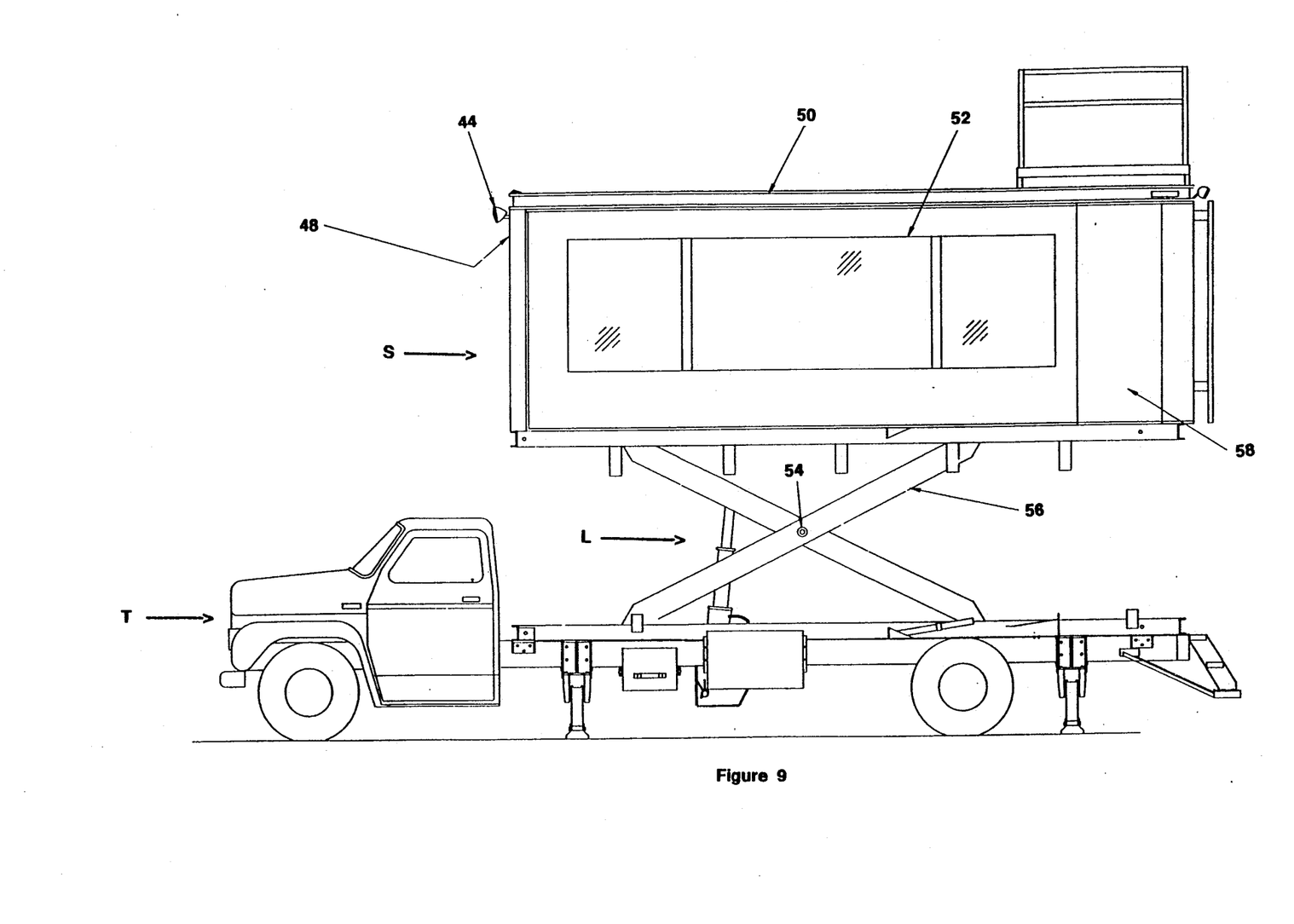
FIG. 9 shows the embodiment of FIG. 7 as the studio is being elevated.

FIG. 9 illustrates the embodiment of FIG. 7 as studio S is being elevated. Lift means L, attached between the truck chassis and base of studio S, includes a heavy duty scissor mechanism 56. Such scissor mechanisms have years of proven experience. Pivot point 54 of scissor mechanism 56 should be designed for easy lubrication. In the embodiment of FIG. 9 the outside of studio body 58 is anticipated to be constructed of a prepainted white aluminum. It is intended that the embodiment provide maximum viewing window sizes 52 to the left, right and rear of studio S. It is further anticipated that windows W will slide open. In the embodiment of FIG. 9, studio S is anticipated to have a body size in its retracted configuration of approximately 25 feet long and 8½ wide. It is anticipated that such studio S can expand to a expanded configuration of 20 feet wide. Location 48 illustrates the location in the embodiment of FIG. 9 for push button controls for elevating studio S. Keyed locks are anticipated to be available. Balcony B in the embodiment of FIG. 9 comprises a reinforced camera platform of approximately 6 feet by 8 feet.

Figure 10:
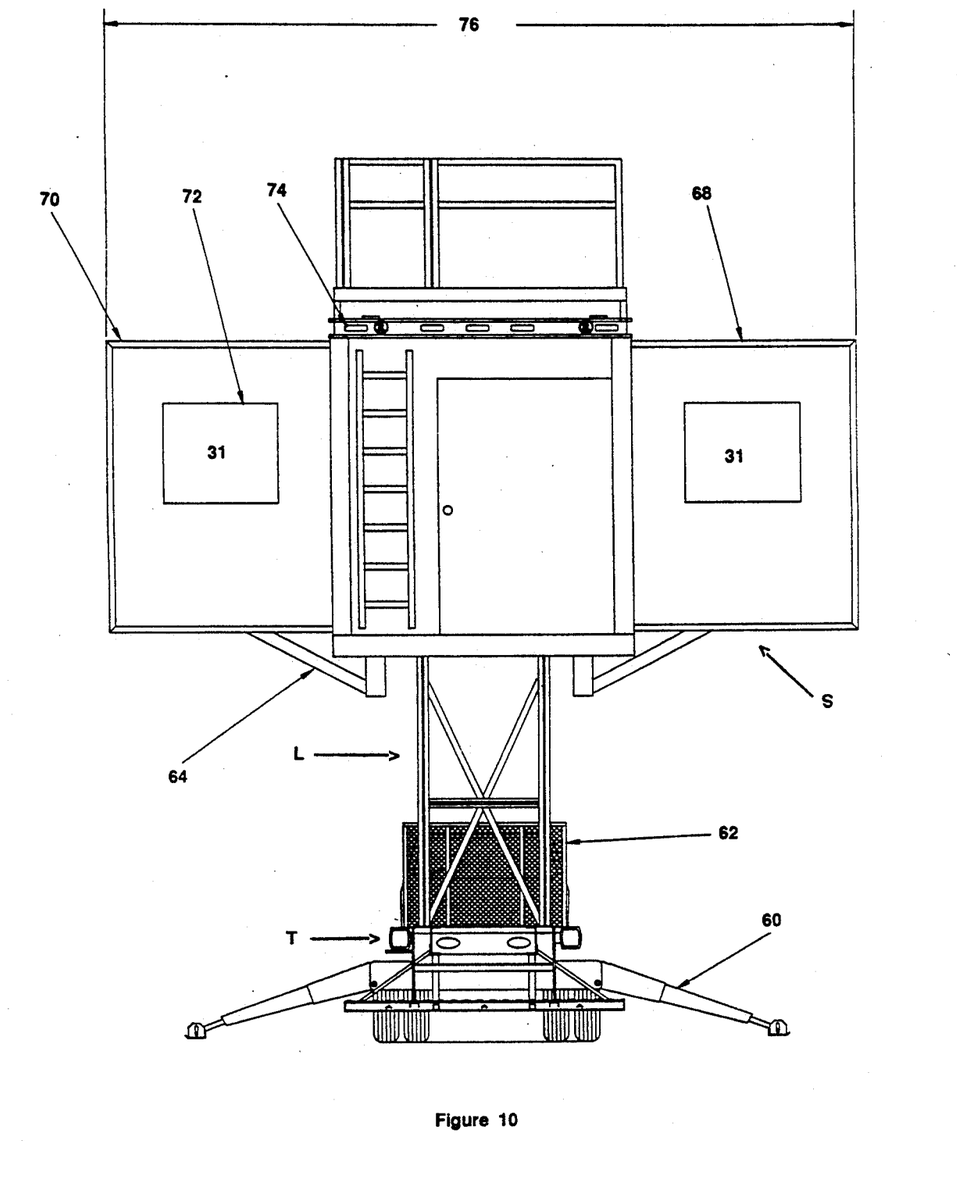
FIG. 10 offers a rear view of the embodiment of FIG. 7 with the studio elevated and expanded.

FIG. 10 illustrates a rear view of the embodiment of FIG. 7 wherein the studio is elevated and expanded. FIG. 10 illustrates heavy duty extended stabilizers 60 which are capable of supporting the weight of the vehicle system. Lighting 74 to meet DOT standards for over the road equipment is illustrated. Supports 64 for the extended body of studio S are illustrated in FIG. 10. Width 76 of expanded studio S is approximately 20 feet. Left and right body extension 70 and 68 expand from a custom built studio S body.

Figure 11:
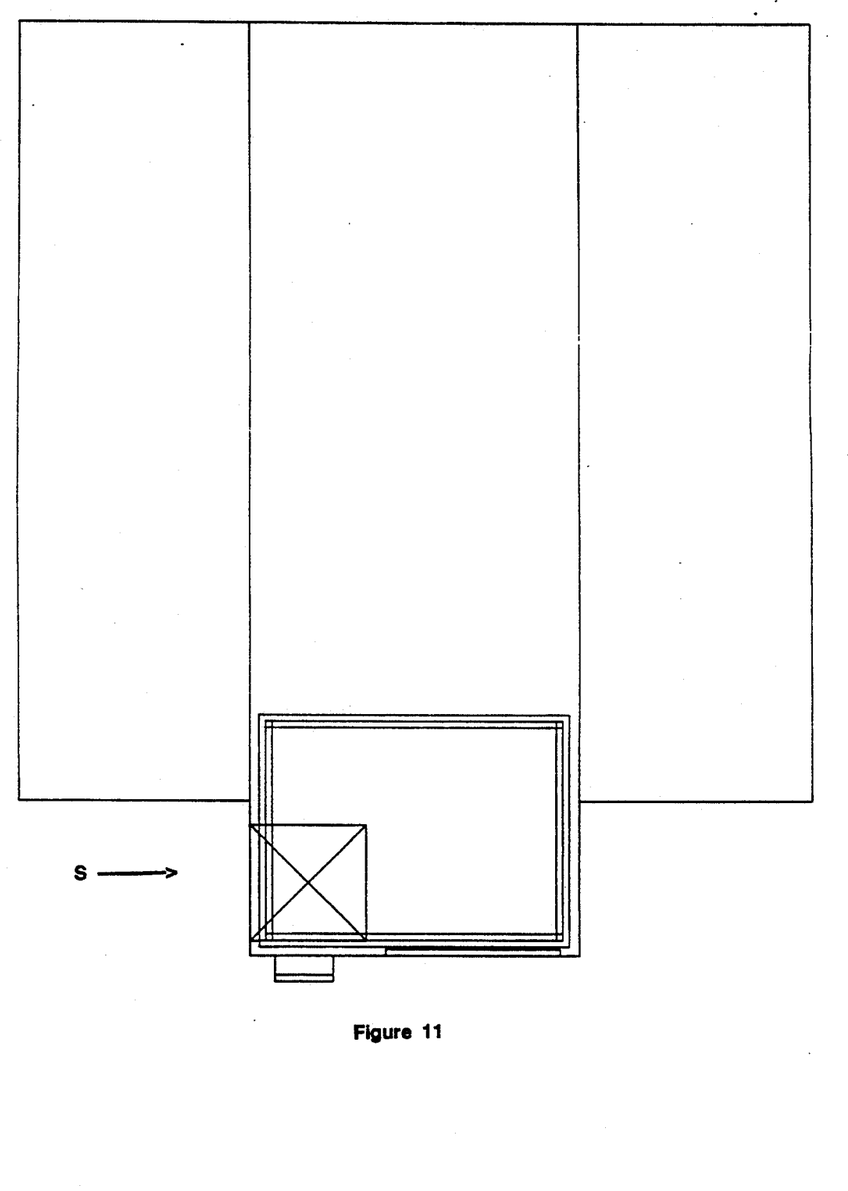
FIG. 11 offers an illustrative floor plan of the studio of the embodiment of FIG. 7, as expanded.

FIG. 11 illustrates the floor plan of an expanded studio S. The embodiment illustrated in FIG. 7 includes a studio S that expands to offer a studio of dimensions approximately 20 feet by 25 feet, to offer 500 square feet of floor space.

Figure 12:
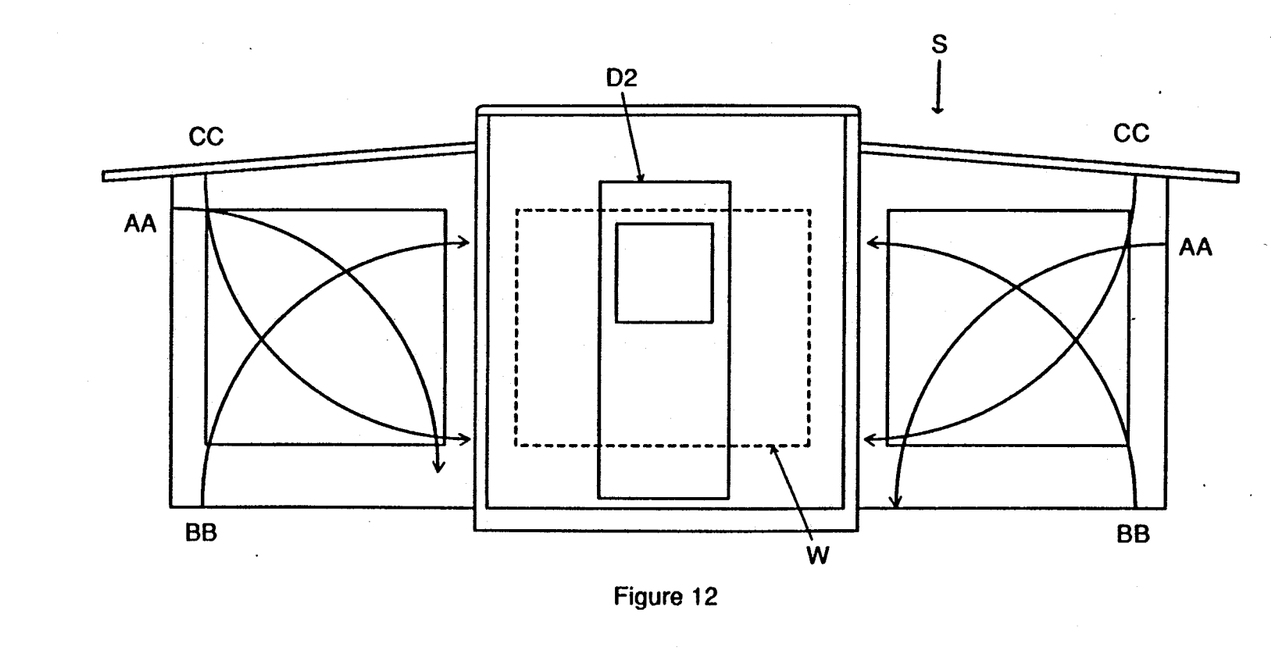
FIG. 12 offers an illustrative rear view of the expandable studio indicating one method for expansion.
Figure 13:
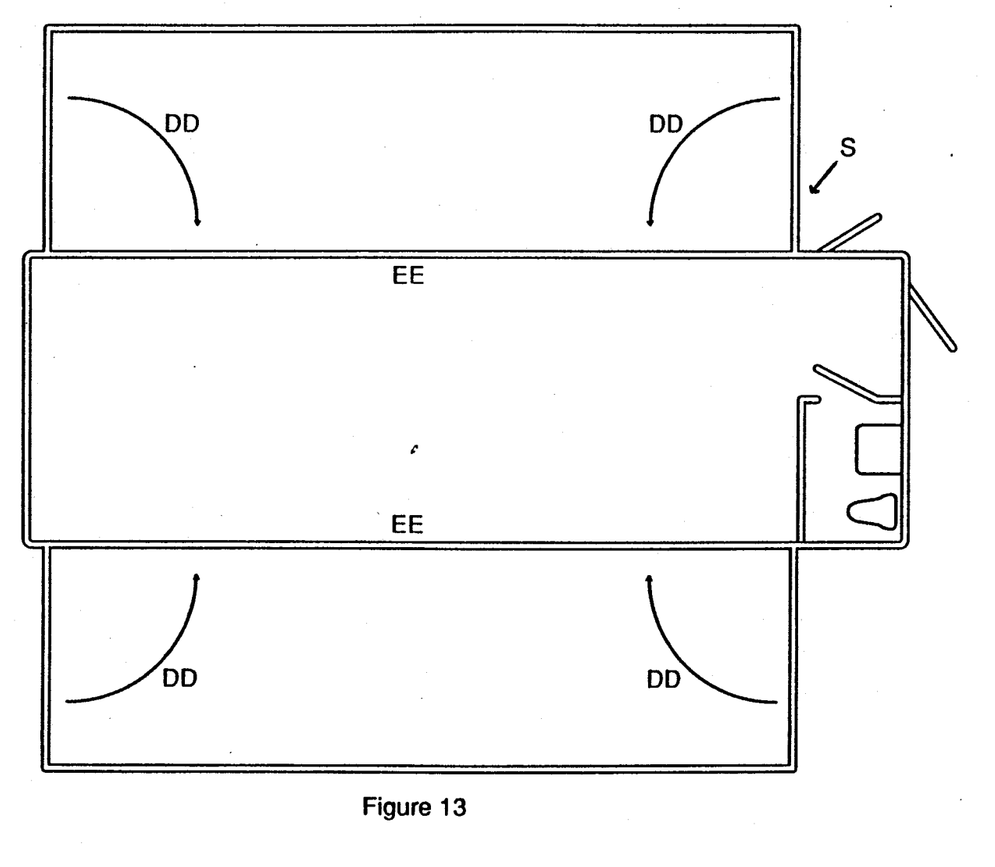
FIG. 13 offers a top view of the embodiment of FIG. 12, further indicating one method for expansion.

FIGS. 12 and 13 offer a rear and top view, respectively, of an expanded studio illustrating a method of expansion and retraction. In the embodiment of FIGS. 12 and 13 sidewalls DD fold into body EE. Walls AA fold down onto floor BB. Floor BB then folds up vertically. Roof CC folds down vertically against floor BB.

In operation, studio S in retracted configuration, illustrated in FIGS. 7 and 8, is trucked to an appropriate on-site location. See FIG. 6. FIG. 8 offers a rear view of studio S in retracted configuration as it might be trucked by truck T. Upon selection of a suitable location for the mobile studio, such as illustrated in FIG. 6, truck T is parked as illustrated in FIG. 7. Utilizing lift means L, studio S in its retracted configuration is elevated, as illustrated in FIG. 9. The preferred means of elevation comprises hydraulic lift means. Subsequent to elevation, studio S is extended to an expanded configuration, such as illustrated in FIGS. 10 and 11 or FIGS. 1 through 5. One means for expanding studio S from a retracted configuration to an extended configuration would involve expanding both sides of the studio. The body of studio S could expand, in one means, by folding outwards, as illustrated in FIGS. 12 and 13. The body could fold outwards approximately 7 feet on both sides by such method. In particular, achieving this expansion could involve hinging upwardly side walls of the retracted body of the studio from an expanded floor position. Expanded ceilings or roofs could hinge outwardly from the nonexpanded body. Expanded floor portions could hinge down from the nonexpanded body and expanded front and back outer wall sections could hinge sideways from the body of the retracted studio. It is anticipated that the outer wall and the separate sidewall units would contain extra large viewing windows.

Alternately, studio S could expand by other means known in the art of expandable buildings, including telescoping outwardly a wall, floor and ceiling unit.

The foregoing disclosure and description of the invention are illustrative and explanatory thereof. Various changes in the size, shape and materials as well as the details of the illustrated construction may be made without departing from the spirit of the invention.

I claim:

1. A method for providing a mobile elevatable viewing studio for outdoor events, comprising:
   trucking a studio in a retracted configuration to an outdoor location, the retracted studio having a width, height and length such that it can be trucked over a highway system;
   elevating the studio at least ten feet by automatic means attached between a truck chassis and studio base; and
   expanding the studio in at least one direction.

2. The method of claim 1 wherein the studio is expanded in two opposing directions.

3. The method of claim 1 wherein the elevating includes operating hydraulic lift means.

4. The method of claim 1 that includes raising and lowering an elevatable balcony attached to one side of the studio.

5. A mobile, elevatable, expandable and retractable viewing studio system, comprising
   a studio having a retracted and an expanded configuration;
   the studio in retracted configuration having a width, height and length that can be trucked over a highway system;
   a truck chassis attached to the studio base;
   automatically operated lift means attached between the studio base and the truck chassis for
   elevating the studio at least ten feet above the chassis; and wherein the studio has at least one expandable side.

6. The system of claim 5 wherein the studio has two opposing expandable sides.

7. The system of claim 5 wherein the lift means includes hydraulic operation.

8. The system of claim 5 that includes an elevatable balcony attached to one side of the studio.

9. The system of claim 5 wherein the side walls of the studio in expanded configuration include wide viewing windows.

10. The system of claim 5 wherein the studio in expanded configuration is over twice the size, measured in floor space, as the studio in retracted size.

* * * * *